United States Patent
Ando et al.

(10) Patent No.: US 7,035,265 B2
(45) Date of Patent: Apr. 25, 2006

(54) MULTIPLEXER AND PRIORITY CONTROL METHOD FOR PACKET DATA TRANSMISSIONS

(75) Inventors: Tatsuhiko Ando, Koriyama (JP); Kanichi Sato, Koriyama (JP)

(73) Assignee: Hitachi Telecom Technologies, Ltd., Fukushima-ken (JP)

( * ) Notice: Subject to any disclaimer, the term of this patent is extended or adjusted under 35 U.S.C. 154(b) by 835 days.

(21) Appl. No.: 09/957,533

(22) Filed: Sep. 21, 2001

(65) Prior Publication Data

US 2002/0044556 A1    Apr. 18, 2002

(30) Foreign Application Priority Data

Jun. 26, 2000   (JP)   ............................. 2000-191247

(51) Int. Cl.
*H04L 12/28* (2006.01)
*H04J 3/02* (2006.01)

(52) U.S. Cl. .................. 370/395.42; 370/394; 370/538
(58) Field of Classification Search ........... 370/395.21, 370/395.4, 395.42, 43, 538, 399, 428, 539
See application file for complete search history.

(56) References Cited

U.S. PATENT DOCUMENTS 5,499,238 A * 3/1996 Shon .......................... 370/399
5,805,595 A * 9/1998 Sharper et al. ............. 370/442

* cited by examiner

*Primary Examiner*—Afsar Qureshi
(74) *Attorney, Agent, or Firm*—Mattingly, Stanger, Malur & Brundidge, P.C.

(57) ABSTRACT

Opportunities to transmit ATM cells of identical level onto an ATM line are equally afforded to respective terminal side lines. In a cell assembler/disassembler, data from the terminal side lines 1100 are turned into ATM cells, and the ATM cells are assigned priority levels. Then, the ATM cells are stored in internal buffers 111–116 respectively corresponding to the terminal side lines 1100. The priority controller 1210 selects the ATM cells of the highest priority levels from within the respective internal buffers, and further selects the ATM cell of the highest priority level as an ATM cell to-be-transmitted from among the selected ATM cells. In the presence of a plurality of such ATM cells of the highest priority level, the priority controller 1210 determines the ATM cell to-be-transmitted in accordance with the priority sequence of the internal buffers in which the ATM cells of the highest priority level are stored. Each time the priority controller 1210 selects the ATM cell to-be-transmitted, it alters the priority sequence of the internal buffers so that the priority sequence of the internal buffer having stored the ATM cell to-be-transmitted therein may become the latest.

4 Claims, 4 Drawing Sheets

MULTIPLEXER AND PRIORITY CONTROL METHOD FOR PACKET DATA TRANSMISSIONS

BACKGROUND OF THE INVENTION

The present invention relates to priority control technology for packet data transmissions in a multiplexer such as ATM (Asynchronous Transfer Mode) multiplexer or IP (Internet Protocol) multiplexer.

There has heretofore been known an ATM multiplexer or IP multiplexer (hereinbelow, generally termed "multiplexer") which assembles data sent from a plurality of terminal side lines, into ATM cells or IP packets (hereinbelow, generally termed "packet data") and transmits the packet data onto an ATM line or IP network (hereinbelow, generally termed "network side line"), and which restores packet data sent from on the network side line and transmits the restored data to the plurality of terminal side lines.

Hitherto, in the multiplexer of this type, the priority control of the packet data transmissions onto the network side line has been performed in the following way:

Priority levels are previously assigned to the respective terminal side lines in accordance with the classes etc. of terminals which are connected to the terminal side lines. Besides, when packet data has been generated, it is assigned the priority level which is assigned to the source terminal side line of data stored in this packet data. In the presence of a plurality of items of packet data which are to be transmitted onto the network side line, the packet data to which a higher priority level is assigned and which has been generated earlier is transmitted onto the network side line in preference to the other packet data.

With the above prior art, in a case, for example, where a plurality of terminal side lines of different transmission speeds having an identical priority level are accommodated, and where the transmission speeds of the plurality of terminal side lines are higher than the transmission speed of a network side line, there arises the problem that opportunities for packet data transmissions cannot be equally afforded to the plurality of terminal side lines.

It is assumed that by way of example a case where, during a time period in which packet data can be transmitted onto the network side line once, packet data are generated 9 times on the basis of data sent from the first terminal side line assigned the highest priority level, while packet data is generated once on the basis of data sent from the second terminal side line assigned the same highest priority level. In this case, in a time period in which packet data can be transmitted onto 10 times, 9 times among the 10 times are used for the transmissions of the packet data based on the data sent from the first terminal side line, while only one remaining time is used for the transmission of the packet data based on the data sent from the second terminal side line. As a result, notwithstanding that the same priority level is assigned, the second terminal side line is given the smaller number of opportunities as compared with the first terminal side line with regard to the transmissions of the packet data.

SUMMARY OF THE INVENTION

The present invention has been made in view of the above circumstances, and has for its object to afford equal opportunities for transmissions onto a network side line, to packet data which have an identical priority level and which have been generated on the basis of data from a plurality of terminal side lines.

In order to accomplish the object, according to the present invention, a sequence of the transmissions of packet data onto a network side line, the packet data having been obtained by packetizing data sent from a plurality of terminal side lines, is subjected to a priority control in the following way:

There are carried out:

the priority sequence determination step of determining a priority sequence of the terminal side lines so that at least the source terminal side line of data stored in packet data selected as packet data to-be-transmitted in a last cycle may become the latest in the priority sequence among the source terminal side lines of data stored in packet data of the same level as a priority level of the packet data storing therein the data sent from the first-mentioned source terminal side line; and the "packet data to-be-transmitted" selection step of selecting packet data which has the highest priority level and as to which the priority sequence of the source terminal side line of data stored therein is the earliest, among packet data which are obtained from data sent from the individual terminal side lines, as packet data to-be-transmitted in a current cycle, in accordance with priority levels of the respective packet data specified under predetermined rules and with the priority sequence of said individual terminal side lines.

Subsequently, the packet data selected as the packet data to-be-transmitted in the current cycle is transmitted onto the network side line.

According to the present invention, even in a case, for example, where packet data having the highest priority level are generated concerning only data sent from the first terminal side line and the second terminal side line, and where the packet data based on the data sent from the first terminal side line are generated more frequently because of the higher transmission speed of the first terminal side line, while the packet data based on the data sent from the second terminal side line are generated less frequently because of the lower transmission speed of the second terminal side line (provided that a time period in which a packet is generated on the basis of the data from each of the terminal side lines is shorter than a time period in which the packet data can be transmitted onto the network side line once), the transmission of one packet data generated on the basis of the data sent from the first terminal side line is followed by the transmission of one packet data generated on the basis of the data sent from the second terminal side line, because the priority sequence is changed upon the former transmission so as to make the turn of the first terminal side line later than that of the second terminal side line. Accordingly, opportunities to transmit packet data onto the network side line can be equally afforded to the plurality of terminal side lines having the identical priority level.

DETAILED DESCRIPTION OF THE PREFERRED EMBODIMENTS

Now, embodiments of the present invention will be described.

First, the first embodiment of the present invention will be described.

Figure 1:
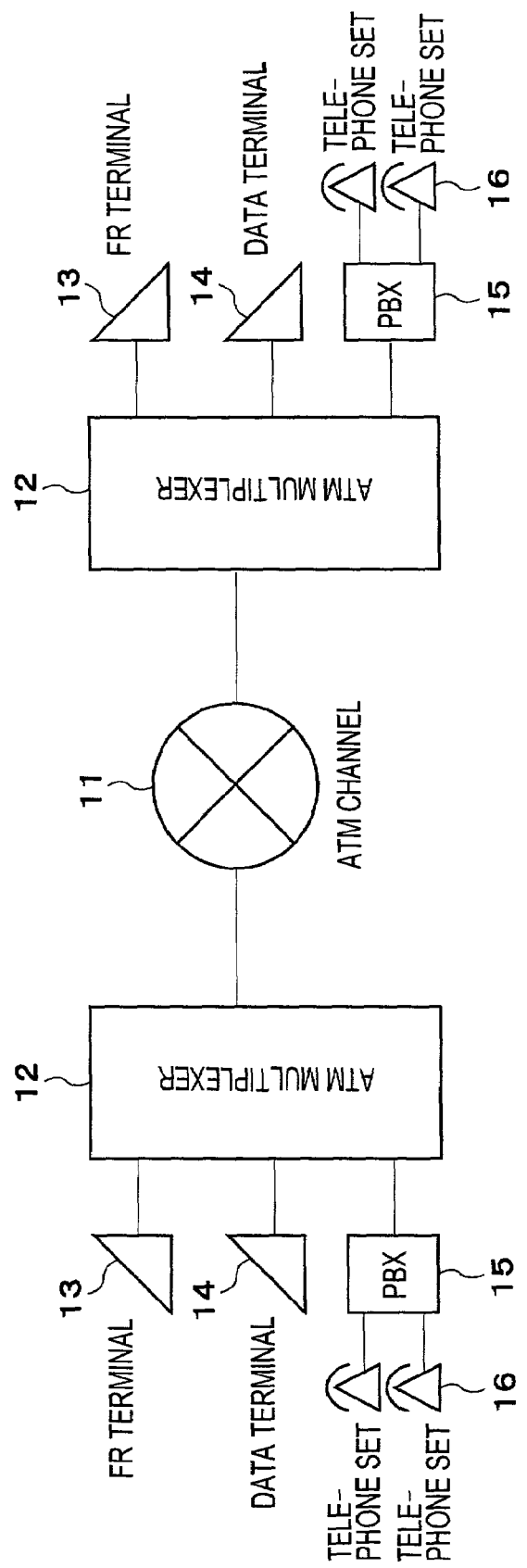
FIG. 1 is a constitutional diagram of a communication system which includes an ATM multiplexer being the first embodiment of the present invention.

FIG. 1 shows the construction of a communication system which includes an ATM multiplexer being the first embodiment of the present invention.

In the figure, numeral 11 designates an ATM line, numeral 12 the ATM multiplexer to which this embodiment is applied, numeral 13 an FR (frame relay) terminal, numeral 14 a data terminal, numeral 15 a PBX (Private Branch Exchange), and numeral 16 a telephone set.

The ATM multiplexer 12 turns into ATM cells (or packetizes) data respectively sent from the FR terminal 13, data terminal 14 and PBX 15 which are accommodated by the ATM multiplexer itself, it multiplexes the ATM cells, and it transmits the multiplexed ATM cells onto the ATM line 11. Besides, the ATM multiplexer 12 demultiplexes into ATM cells the multiplexed data sent from the ATM line 11, it decellularizes the ATM cells, and it transmits the resulting data to the FR terminal 13, data terminal 14 and PBX 15. Thus, it is permitted to establish communications between the FR terminal 13, data terminal 14 and PBX 15 which are accommodated by the particular ATM multiplexer 12 itself, and the FR terminal 13, data terminal 14 and PBX 15 which are accommodated by the ATM multiplexer 12 opposing to the particular ATM multiplexer through the ATM line 11.

Figure 2:
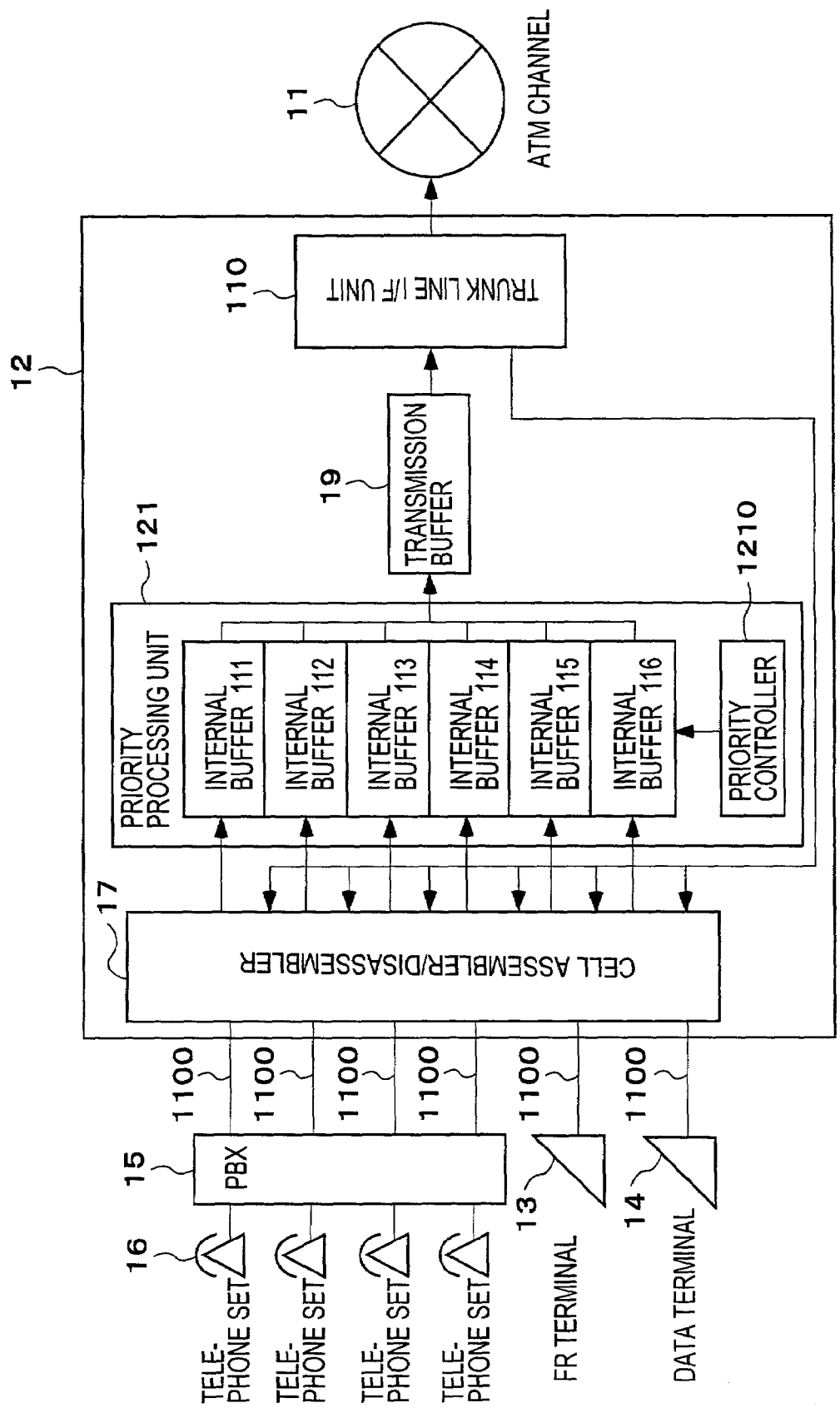
FIG. 2 is a block diagram of the ATM multiplexer which is the first embodiment of the present invention.

Next, FIG. 2 shows the construction of the ATM multiplexer 12.

As shown in the figure, the ATM multiplexer 12 includes a cell assembler/disassembler 17, an ATM line interface unit 110, a transmission buffer 19 and a priority processing unit 121.

The ATM line interface unit 110 accommodates the ATM line 11. It delivers multiplexed data transmitted from the ATM line 11, to the cell assembler/disassembler 17, while it transmits an ATM cell stored in the transmission buffer 19, onto the ATM line 11.

The cell assembler/disassembler 17 accommodates a plurality of terminal side lines 1100 which are respectively connected to the FR terminal 13, data terminal 14 and PBX 15. This cell assembler/disassembler 17 turns data sent from each terminal side line 1100, into an ATM cell and then delivers the ATM cell to the priority processing unit 121. Besides, it demultiplexes the multiplexed data delivered from the ATM line interface unit 110, into ATM cells and further decellularizes the ATM cells. In addition, it sends restored data to the terminal side lines 1100 to which the equipment of the destinations of the data are respectively connected.

The priority processing unit 121 includes a priority controller 1210, and internal buffers 111–116 which are disposed in correspondence with the plurality of terminal side lines 1100.

The internal buffers 111–116 store therein the ATM cells based on the data from their corresponding terminal side lines 1100 as are delivered from the cell assembler/disassembler 17. Incidentally, a sequence is afforded to the internal buffers 111–116 beforehand. Here, the sequence of the internal buffers is assumed to be in the order of the numerals 111, 112, 113, 114, 115 and 116.

The priority controller 1210 selects one of the ATM cells stored in the internal buffers 111–116, as an ATM cell to-be-transmitted and then stores the selected ATM cell in the transmission buffer 19.

Next, there will be elucidated a priority control process in the ATM multiplexer 12 of the above construction for ATM cells which are to be transmitted onto the ATM line 11.

First, the cell assembler/disassembler 17 generates ATM cells which store data respectively sent from the plurality of terminal side lines 1100, and it describes the priority levels of the pertinent cells in the space areas of the headers of these cells. Besides, it stores the cells in the respectively corresponding internal buffers 111–116 which are disposed in correspondence with the terminal side lines 1100. Here, a method for setting the priority levels of the pertinent ATM cells to be described in the headers of these cells may be as desired. By way of example, it is also allowed to fixedly assign priority levels to the respective terminal side lines 1100 beforehand, and to describe in the headers of the ATM cells the priority levels which are assigned to the destination terminal side lines 1100 of the data stored in the pertinent ATM cells.

Subsequently, the priority controller 1210 operates every transmission cycle of the ATM cell to search the internal buffers 111–116 in succession under rules explained below, and to select one ATM cell from any of the internal buffers as an ATM cell to-be-transmitted and store the selected cell in the transmission buffer 19.

First, the internal buffer to be searched first is set to be the internal buffer succeeding in sequence to the internal buffer in which the ATM cell selected as the one to-be-transmitted in the last cycle was stored. By way of example, in a case where the ATM cell of the internal buffer 111 was selected as the ATM cell to-be-transmitted in the last cycle, the internal buffer 112 is set as the internal buffer which is to be searched first. Incidentally, in a case where the internal buffer in which the ATM cell selected as the one to-be-transmitted in the last cycle was stored is the internal buffer 116, the internal buffer 111 which is the first in the afforded sequence is set as the internal buffer which is to be searched first.

Subsequently, when the internal buffer to be searched first has been determined in the above way, the internal buffers 111–116 are successively searched in the sequence afforded thereto, with the determined internal buffer at the head. Besides, the ATM cells of the highest priority levels stored are respectively detected from within the internal buffers 111–116. Here, in a case where the internal buffer determined as the one to be searched first is not the internal buffer 111 which is the earliest in the sequence, the search sequence of the internal buffers 111–116 becomes as follows: The internal buffers 111–116 are searched from the head one determined to be searched first, to the internal buffer 116 being the latest in the sequence, in the afforded sequence. Thereafter, the internal buffer to be searched is returned to the internal buffer 111 being the earliest in the sequence, and the search is continued up to the internal buffer which directly precedes in the sequence to the head one determined to be searched first. That is, with the head being the internal buffer determined to be searched first, the internal buffers 111–116 are cyclically searched in the sequence afforded thereto.

Subsequently, among the ATM cells detected from the internal buffers 111–116 one by one, the ATM cell of the highest priority level is selected as the ATM cell to-be-transmitted. In the presence of a plurality of such ATM cells of the highest priority level, the ATM cell stored in that one of the internal buffers 111–116 which was searched earliest is selected as the ATM cell to-be-transmitted.

Thereafter, the priority level described in the header of the ATM cell selected as the one to-be-transmitted is erased, and the ATM cell is stored in the transmission buffer 19.

Thus far, the first embodiment of the present invention has been described.

According to this embodiment, even in a case, for example, where ATM cells of the highest priority level are stored in the internal buffers 111 and 112 and where the ATM cells of that level in a large number are stored in the internal buffer 111, the transmission of one of the ATM cells of that level stored in the internal buffer 111 is followed by the transmission of the ATM cell of that level stored in the internal buffer 112. Besides, the internal buffers 111–116 are disposed in correspondence with the respective terminal side lines 1100. As a result, the ATM cells based on data sent from the terminal side lines 1100 of the same level can be transmitted onto the ATM line 11 by affording equal opportunities to the respective terminal side lines 1100.

Next, the second embodiment of the present invention will be described.

Figure 3:
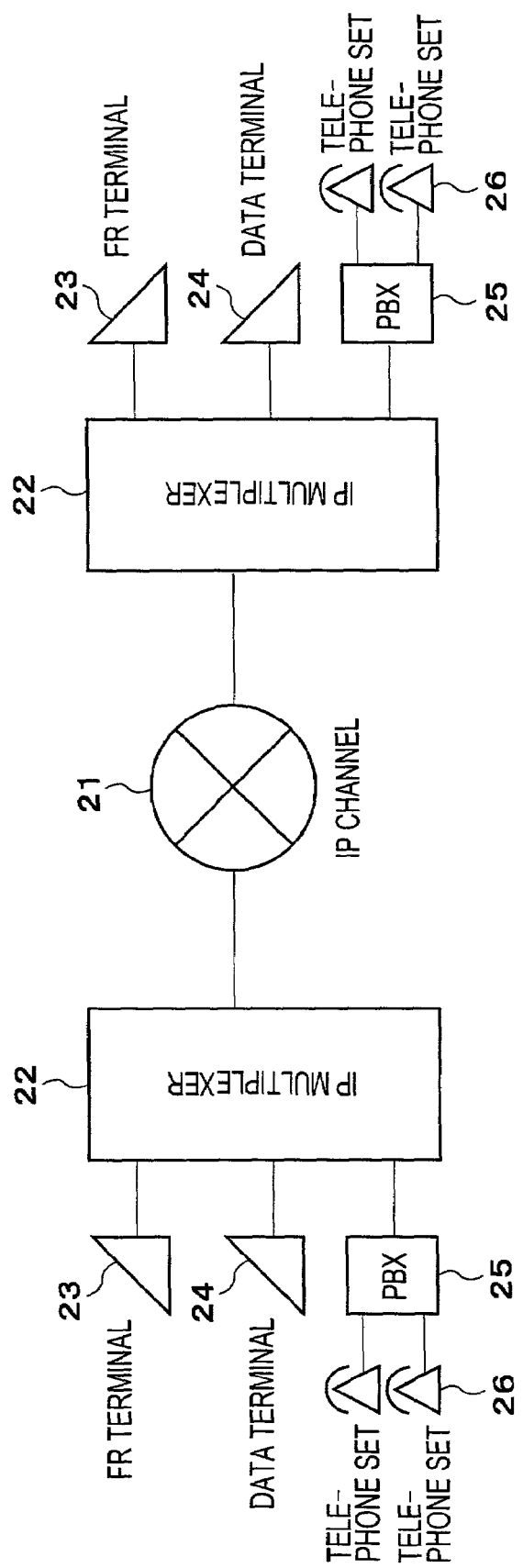
FIG. 3 is a constitutional diagram of a communication system which includes an IP multiplexer being the second embodiment of the present invention.

FIG. 3 shows the construction of a communication system which includes an IP multiplexer being the second embodiment of the present invention.

In the figure, numeral 21 designates an IP network, numeral 22 the IP multiplexer to which this embodiment is applied, numeral 23 an FR terminal, numeral 24 a data terminal, numeral 25 a PBX, and numeral 26 a telephone set.

The IP multiplexer 22 turns into IP packets (or packetizes) data respectively sent from the FR terminal 23, data terminal 24 and PBX 25 which are accommodated by the IP multiplexer itself, it multiplexes the IP packets, and it transmits the multiplexed IP packets onto the IP network 21. Besides, the IP multiplexer 22 demultiplexes into IP packets the multiplexed data sent from the IP network 21, it restores the IP packets, and it transmits the resulting data to the FR terminal 23, data terminal 24 and PBX 25. Thus, it is permitted to establish communications between the FR terminal 23, data terminal 24 and PBX 25 which are accommodated by the particular IP multiplexer 22 itself, and the FR terminal 23, data terminal 24 and PBX 25 which are accommodated by the IP multiplexer 22 opposing to the particular IP multiplexer through the IP network 21.

Figure 4:
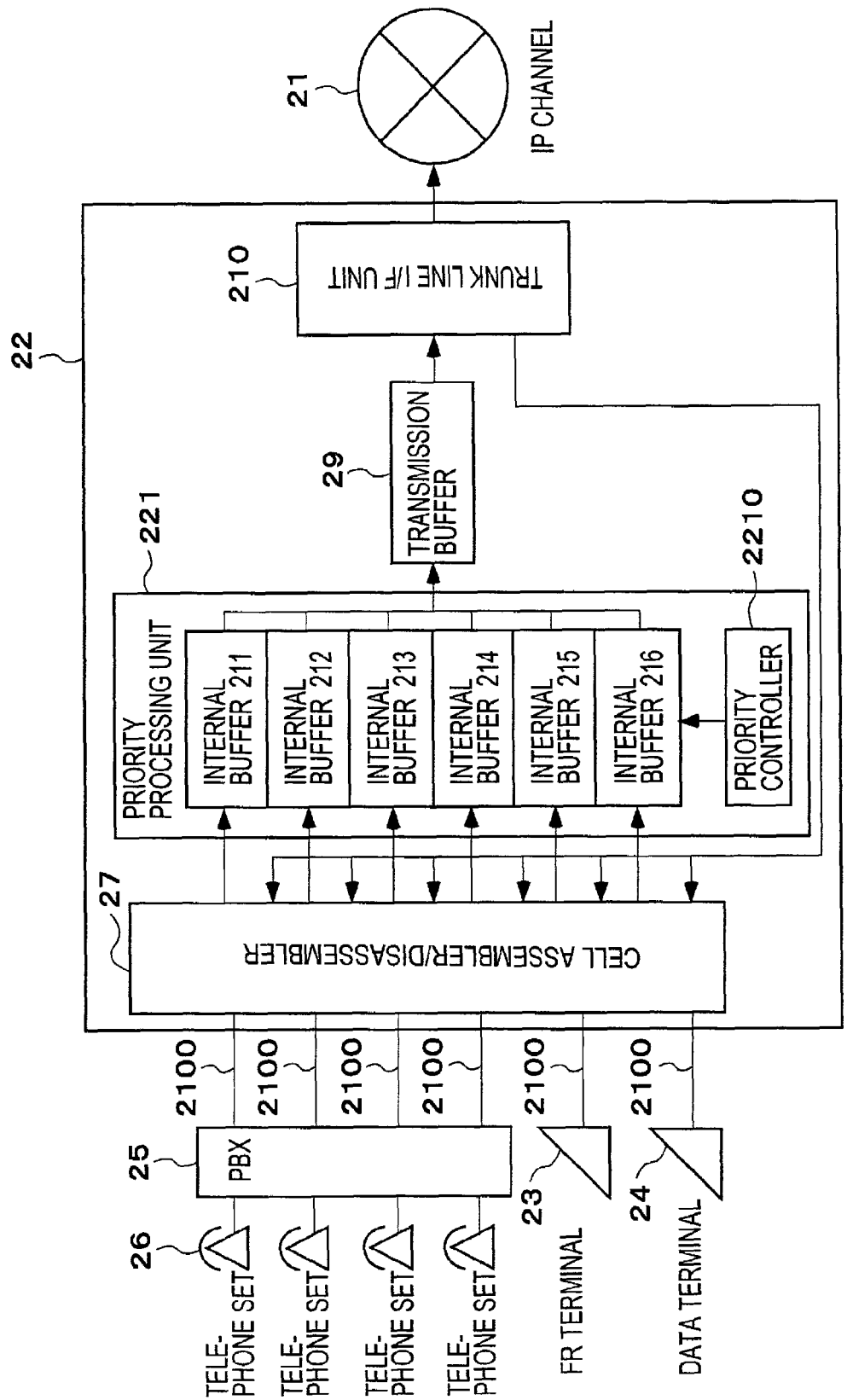
FIG. 4 is a block diagram of the IP multiplexer which is the second embodiment of the present invention.

Next, FIG. 4 shows the construction of the IP multiplexer 22.

As shown in the figure, the IP multiplexer 22 includes an IP packet assembler/disassembler 27, an IP line interface unit 210, a transmission buffer 29 and a priority processing unit 221.

The IP line interface unit 210 accommodates the IP network 21. It delivers multiplexed data transmitted from the IP network 21, to the IP packet assembler/disassembler 27, while it transmits an IP packet stored in the transmission buffer 29, onto the IP network 21.

The IP packet assembler/disassembler 27 accommodates a plurality of terminal side lines 2100 which are respectively connected to the FR terminal 23, data terminal 24 and PBX 25. This IP packet assembler/disassembler 27 turns data sent from each terminal side line 2100, into an IP packet and then delivers the IP packet to the priority processing unit 221. Besides, it demultiplexes the multiplexed data delivered from the IP line interface unit 210, into IP packets and further restores the IP packets. In addition, it sends restored data to the terminal side lines 2100 to which the equipment of the destinations of the data are respectively connected.

The priority processing unit 221 includes a priority controller 2210, and internal buffers 211–216 which are disposed in correspondence with the plurality of terminal side lines 2100.

The internal buffers 211–216 store therein the IP packets based on the data from their corresponding terminal side lines 2100 as are delivered from the IP packet assembler/disassembler 27. Incidentally, a sequence is afforded to the internal buffers 211–216 beforehand. Here, the sequence of the internal buffers is assumed to be in the order of the numerals 211, 212, 213, 214, 215 and 216.

The priority controller 2210 selects one of the IP packets stored in the internal buffers 211–216, as an IP packet to-be-transmitted and then stores the selected IP packet in the transmission buffer 29.

Next, there will be elucidated a priority control process in the IP multiplexer 22 of the above construction for IP packets which are to be transmitted onto the IP network 21.

First, the IP packet assembler/disassembler 27 generates IP packets which store data respectively sent from the plurality of terminal side lines 2100, and it describes the priority levels of the pertinent IP packets in the space areas (for example, option fields) of the headers of these IP packets. Besides, it stores the IP packets in the respectively corresponding internal buffers 211–216 which are disposed in correspondence with the terminal side lines 2100. Here, a method for setting the priority levels of the pertinent IP packets to be described in the headers of these IP packets may be as desired. By way of example, it is allowed to fixedly assign priority levels to the respective terminal side lines 2100 beforehand, and to describe in the headers of the IP packets the priority levels which are assigned to the destination terminal side lines 2100 of the data stored in the pertinent IP packets.

Subsequently, the priority controller 2210 operates every transmission cycle of the IP packet to search the internal buffers 211–216 in succession under rules explained below, and to select one IP packet from any of the internal buffers as an IP packet to-be-transmitted and store the selected IP packet in the transmission buffer 29.

First, the internal buffer to be searched first is set to be the internal buffer succeeding in sequence to the internal buffer in which the IP packet selected as the one to-be-transmitted in the last cycle was stored. By way of example, in a case where the IP packet of the internal buffer 211 was selected as the IP packet to-be-transmitted in the last cycle, the internal buffer 212 is set as the internal buffer which is to be searched first. Incidentally, in a case where the internal buffer in which the IP packet selected as the one to-be-transmitted in the last cycle was stored is the internal buffer 216, the internal buffer 211 which is the first in the afforded sequence is set as the internal buffer which is to be searched first.

Subsequently, when the internal buffer to be searched first has been determined in the above way, the internal buffers 211–216 are successively searched in the sequence afforded thereto, with the determined internal buffer at the head. Besides, the IP packets of the highest priority levels stored are respectively detected from within the internal buffers 211–216. Here, in a case where the internal buffer determined as the one to be searched first is not the internal buffer 211 which is the earliest in the sequence, the search sequence of the internal buffers 211–216 becomes as follows: The internal buffers 211–216 are searched from the head one determined to be searched first, to the internal buffer 216 being the latest in the sequence, in the afforded sequence. Thereafter, the internal buffer to be searched is returned to the internal buffer 211 being the earliest in the sequence, and the search is continued up to the internal buffer which directly precedes in the sequence to the head one determined to be searched first. That is, with the head being the internal buffer determined to be searched first, the 5 internal buffers 211–216 are cyclically searched in the sequence afforded thereto.

Subsequently, among the IP packets detected from the internal buffers 211–216 one by one, the IP packet of the highest priority level is selected as the IP packet to-be-transmitted. In the presence of a plurality of such IP packets of the highest priority level, the IP packet stored in that one of the internal buffers 211–216 which was searched earliest is selected as the IP packet to-be-transmitted.

Thereafter, the priority level described in the header of the IP packet selected as the one to-be-transmitted is erased, and the IP packet is stored in the transmission buffer 29.

Thus far, the second embodiment of the present invention has been described.

According to this embodiment, even in a case, for example, where IP packets of the highest priority level are stored in the internal buffers 211 and 212 and where the IP packets of that level in a large number are stored in the internal buffer 211, the transmission of one of the IP packets of that level stored in the internal buffer 211 is followed by the transmission of the IP packet of that level stored in the internal buffer 212. Besides, the internal buffers 211–216 are disposed in correspondence with the respective terminal side lines 2100. As a result, the IP packets based on data sent from the terminal side lines 2100 of the same level can be transmitted onto the IP network 21 by affording equal opportunities to the respective terminal side lines 2100.

Incidentally, the present invention is not restricted to the foregoing embodiments, but it is capable of various alterations and modifications within the scope of the purport thereof.

By way of example, in the foregoing embodiment, priority levels are assigned to ATM cells or IP packets, and the priority control is performed in accordance with the priority levels. However, in the case where priority levels are fixedly assigned to the respective terminal side lines, the internal buffers 111–116 or 211–216 may well be respectively assigned the priority levels of the corresponding terminal side lines, unlike the assignment of the priority levels to the ATM cells or IP packets. Also, the priority levels of the internal buffers from which ATM cells or IP packets have been read out may well be employed as the priority levels of the ATM cells or IP packets in the priority controller 1210 or 2210.

As described above, according to the present invention, equal opportunities for transmissions onto a network side line can be afforded to packet data which have an identical priority level and which have been generated on the basis of data from a plurality of terminal side lines.

What is claimed is:

1. A multiplexer which transmits packet data, generated based on data from a plurality of terminal side lines, onto a network side line, said multiplexer comprising:

a plurality of buffers which are respectively disposed in correspondence with said terminal side lines;

terminal side line interface means for accommodating said terminal side lines, packetizing data sent from each of said terminal side lines and storing the packet data in said buffers respectively correspondent to said terminal side lines from which said data has been sent;

priority control means for selecting one of said packet data stored in said buffers, as packet data to-be-transmitted; and network side line interface means for transmitting the packet data selected by said priority control means onto the network side line, wherein said priority control means selects packet data which has the highest priority level and as to which a priority sequence of the buffer storing the packet data therein is the earliest, among packet data stored in said plural buffers, as packet data to-be-transmitted in a current cycle, in accordance with priority levels of the respective packet data specified under predetermined rules by the terminal side line interface means and with the priority sequence of said buffers which is specified so that the buffer having stored therein packet data selected as packet data to-be-transmitted in a last cycle may become the latest among, at least, the buffers storing therein packet data of the same level as the priority level of the packet data to-be-transmitted in the last cycle.

2. A multiplexer as defined in claim 1, wherein the priority levels of said respective packet data specified under the predetermined rules are specified in accordance with said source terminal side lines of the data stored in the packet data.

3. A multiplexer as defined in claim 1, wherein said plurality of buffers have their turns assigned beforehand, and wherein said priority control means sets a cyclic sequence in which the buffer having stored the packet data selected as said packet data to-be-transmitted in said last cycle becomes the latest, while the buffer directly succeeding the latest buffer becomes the earliest, as said priority sequence of said buffers, in accordance with the turns of said respective buffers and with the turn of said buffer having stored said packet data selected as said packet data to-be-transmitted in said last cycle.

4. A priority control method for packet data transmissions which controls a sequence of the transmissions of packet data onto a network side line, the packet data having been obtained by packetizing data sent from a plurality of terminal side lines, comprising:

a priority sequence determination step of determining a priority sequence of the terminal side lines so that at least the source terminal side line of data stored in packet data selected as packet data to-be-transmitted in a last cycle may become the latest in the priority sequence among the source terminal side lines of data stored in packet data of the same level as a priority level of the packet data storing therein the data sent from the first-mentioned source terminal side line; and a packet data to-be-transmitted selection step of selecting packet data which has the highest priority level and as to which the priority sequence of the source terminal side line of data stored therein is the earliest, among packet data which store therein data sent from the individual terminal side lines, as packet data to-be-transmitted in a current cycle, in accordance with priority levels of the respective packet data specified under predetermined rules set when the data is packetized and with the priority sequence of said individual terminal side lines.

* * * * *